(12) United States Patent
Brown et al.

(10) Patent No.: US 8,107,736 B2
(45) Date of Patent: Jan. 31, 2012

(54) SYSTEM AND METHOD FOR DEVICE MAPPING BASED ON IMAGES AND REFERENCE POINTS

(75) Inventors: Jeremy Ray Brown, Orem, UT (US); Jason Allen Sabin, Lehi, UT (US); Daniel Robert Timpson, Lehi, UT (US)

(73) Assignee: Novell, Inc., Provo, UT (US)

( * ) Notice: Subject to any disclaimer, the term of this patent is extended or adjusted under 35 U.S.C. 154(b) by 873 days.

(21) Appl. No.: 12/171,078

(22) Filed: Jul. 10, 2008

(65) Prior Publication Data

US 2010/0008584 A1 Jan. 14, 2010

(51) Int. Cl.
*G06K 9/46* (2006.01)
*G06K 9/62* (2006.01)
(52) U.S. Cl. ........................................ 382/190; 382/225
(58) Field of Classification Search .................. 382/181, 382/190, 209, 218, 225, 284, 306
See application file for complete search history.

(56) References Cited

U.S. PATENT DOCUMENTS 7,693,757 B2 * 4/2010 Zimmerman .................. 705/28
* cited by examiner

*Primary Examiner* — Daniel Mariam
(74) *Attorney, Agent, or Firm* — Haynes & Boone, LLP

(57) ABSTRACT

System and method for mapping a location of each of a plurality of devices in a data center. In one embodiment, the method comprises receiving image data comprising an image of at least a portion of the data center from a source; processing the image data to locate visual identifiers displayed in the image, wherein each of the visual identifiers is associated with one of the devices or with a spatial reference point; extracting the located visual identifiers and determining spatial coordinates for each of the identified visual identifiers from the image; and determining the spatial reference points from the image. The method further comprises developing groups based on extracted visual identifiers and spatial coordinates thereof and the spatial reference points, wherein allowances are made for an angle of the image, wherein each group comprises a subset of related ones of the devices; for each group, comparing each of the visual identifiers of the group with a key to determine information regarding the associated device to obtain processing results; and combining processing results corresponding to multiple images to remove redundant information and produce final results.

20 Claims, 2 Drawing Sheets

SYSTEM AND METHOD FOR DEVICE MAPPING BASED ON IMAGES AND REFERENCE POINTS

BACKGROUND

Data centers and computer laboratories by there nature generally include a number of individual machines, such servers, computers, printers, and other devices, some or all of which are typically interconnected via one or more networks. The sheer number of the machines in such environments make it difficult to inventory and track the physical locations and network connections of each such machine, although doing so is a necessary element of managing these environments.

SUMMARY

One embodiment is a method for mapping a location of each of a plurality of devices in a data center. The method comprises receiving image data comprising an image of at least a portion of the data center from a source; processing the image data to locate visual identifiers displayed in the image, wherein each of the visual identifiers is associated with one of the devices or with a spatial reference point; extracting the located visual identifiers and determining spatial coordinates for each of the identified visual identifiers from the image; and determining the spatial reference points from the image. The method further comprises developing groups based on extracted visual identifiers and spatial coordinates thereof and the spatial reference points, wherein allowances are made for an angle of the image, wherein each group comprises a subset of related ones of the devices; for each group, comparing each of the visual identifiers of the group with a key to determine information regarding the associated device to obtain processing results; and combining processing results corresponding to multiple images to remove redundant information and produce final results.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

Figure 1:
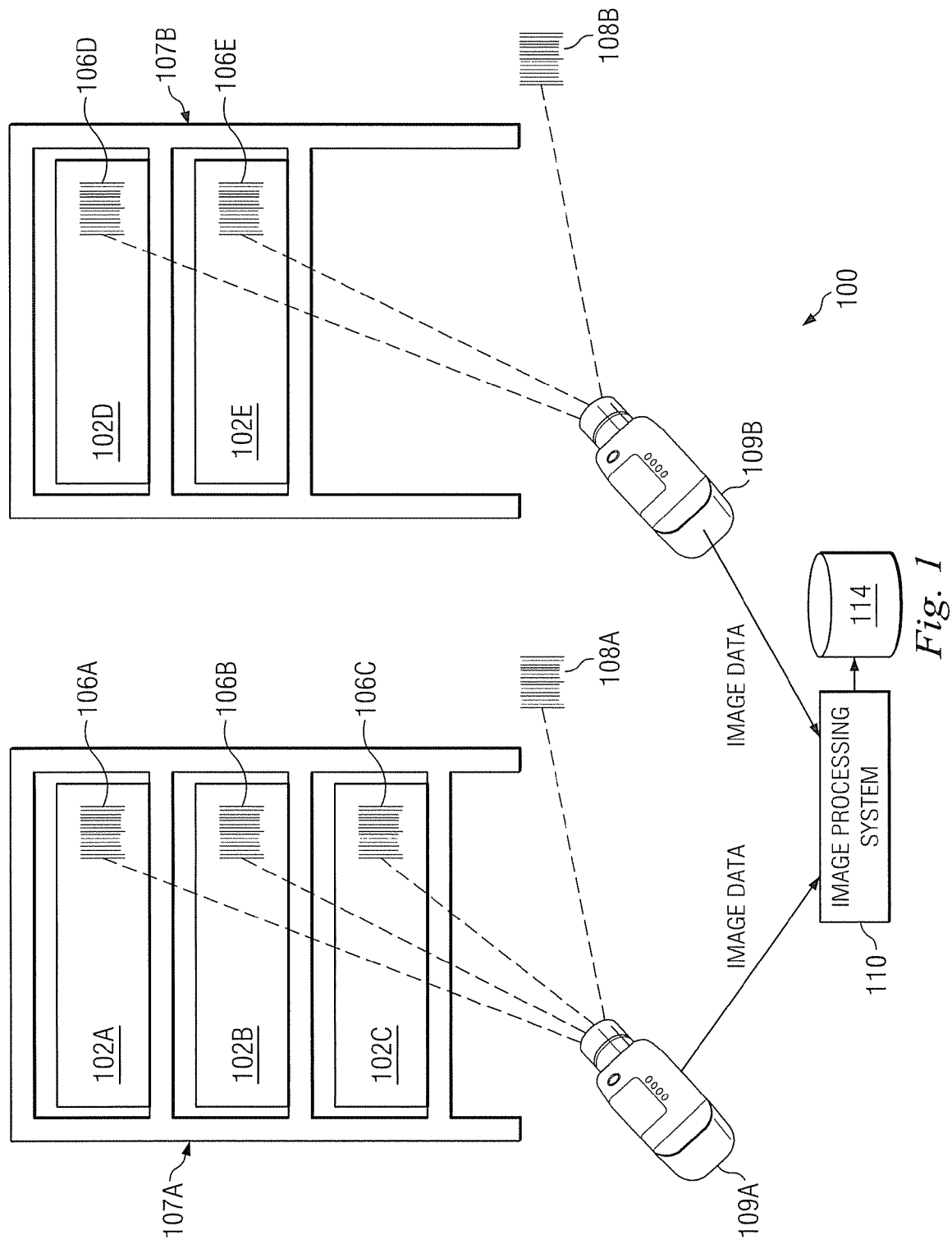
FIG. 1 is a block diagram of an environment in which a system for mapping the location of devices in a data center in accordance with one embodiment may be beneficially implemented.

FIG. 1 is a block diagram of an exemplary data center 100 in which a system for mapping the location of data center devices in accordance with one embodiment may be advantageously implemented. As used herein, "data center" is defined to include any set of computers and related devices, one or more of which may be interconnected directly or via one or more networks and may be supported on shelves, racks, or other appropriate support apparatuses. As shown in FIG. 1, the data center 100 includes a plurality of devices 102A-102E, which may comprise computers and/or other electronic devices. Although not shown, it is understood that the devices 102A-102E may be interconnected via a single network or subsets of the devices may be interconnected by different networks. The data center 100 also includes various In one embodiment, each of the devices 102A-102E has affixed thereto a unique visual identifier 106A-106E, such as, for example, a barcode, for purposes that will be described in greater detail below. One or more of the devices 102A-102E may be supported on or positioned near support apparatuses 107A, 107B, each of which also has affixed thereto a unique visual identifier 108A, 108B.

In accordance with features of one embodiment, the data center 100 includes one or more high-resolution digital still or video cameras, represented in FIG. 1 by digital video cameras 109A and 109B. In accordance with one embodiment, all of the visual identifiers within the data center 100, including the visual identifiers 106A-106E and 108A, 108B as well as visual identifiers affixed to other elements (such as pillars) disposed throughout the data center (not shown) to serve as reference points, must be visible to at least one of the digital cameras 109A, 109B. In the embodiment illustrated in FIG. 1, visibility of a visual identifier to a camera is indicated by a dashed line between the two elements. Image data from the digital cameras 109A, 109B, is transmitted to an image processing system 110, which may be located on- or off-site from the data center 100, via an appropriate connection. The image data is processed by the system 110 as will be described in detail with reference to FIG. 2. The processed image data is stored in a central database 114, which is accessible via one or more network connections (not shown). It will be recognized that, in other embodiments, the database 114 may be replaced with any other appropriate mass storage medium, such as a file system or network attached storage, for example.

Figure 2:
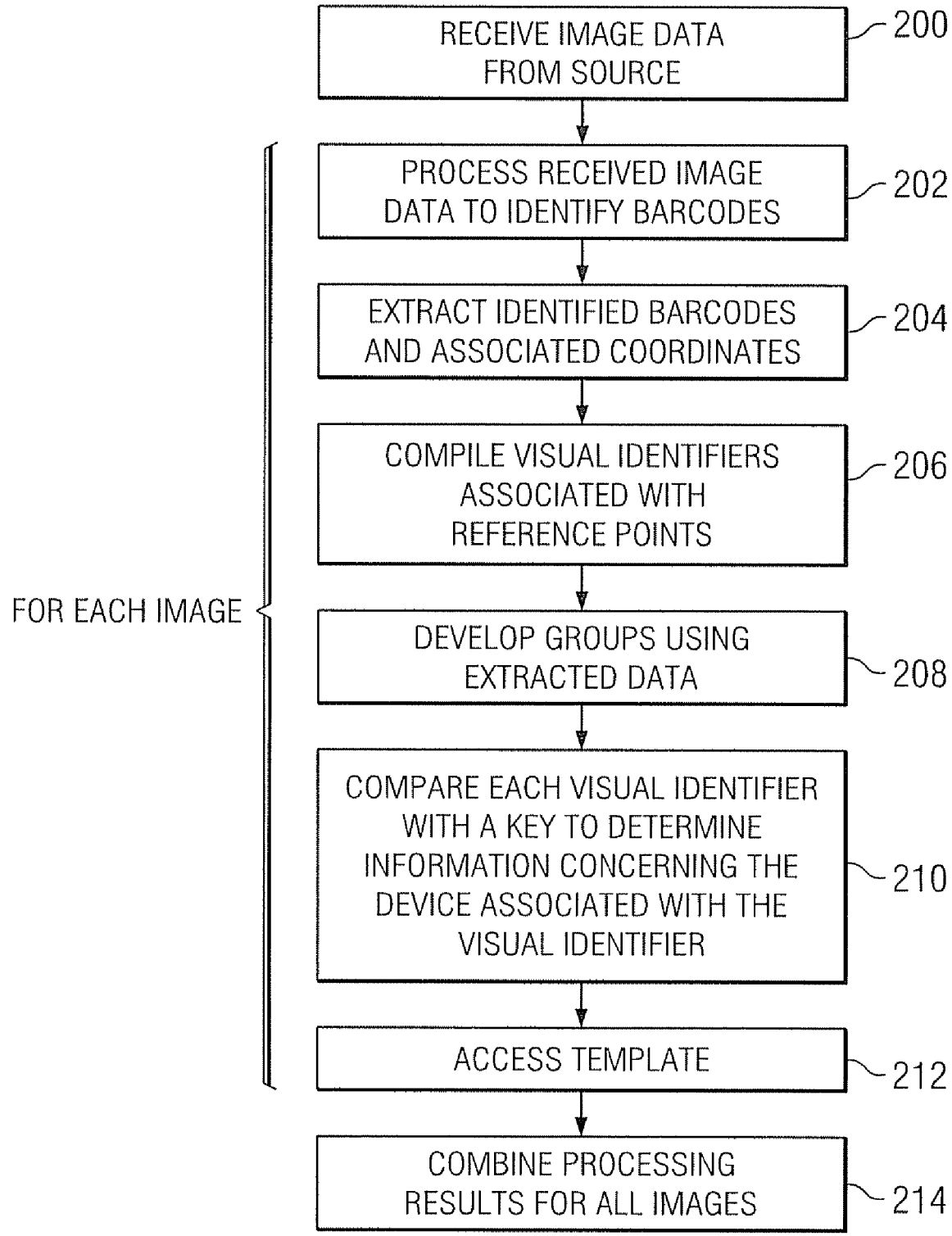
FIG. 2 is flowchart of a method of implementing a system for mapping the location of devices in a data center in accordance with one embodiment.

FIG. 2 is a flowchart of a method for implementing a system for mapping the location of data center devices in accordance with one embodiment. In step 200, the system 110 (FIG. 1) receives image data from a source, such as the digital cameras 109A (FIG. 1). In step 202, the image data is processed to identify the visual identifiers therein. In step 204, for each image, each visual identifier and the coordinates of the visual identifier within the image are extracted. In step 206, visual identifiers that are associated with reference points (e.g., racks, shelves, pillars, etc.) are compiled for use as spatial reference points within the data center 100. It will be recognized that, in addition to or instead of bar codes and similar types of visual identifiers that are attached to objects, other types of image recognition (e.g., patterns, colors, etc.) may be used to identify and define spatial reference points within the data center 100.

In step 208, groups are developed based on the reference points and allowances are made for the angle of the image. As used herein, a "group" refers to a set of devices that are similar in some manner. For example, a group may refer to a set of devices that are similarly oriented with respect to a spatial reference point or to a set of devices that are similar in some other manner (e.g., the same type of device). In a case in which the image shows many visual identifiers, geometry can be used to determine groups and locations of the devices in comparison to the reference points. In this manner, the devices can be lined up linearly or spatially with respect to the reference points to build the groups. At this point, each group actually comprises a single visual identifier with multiple other visual identifiers associated with it.

In step 210, each of the visual identifiers is compared with a key to determine the identity of the device associated with the visual identifier, as well as any additional information available for the identified device. Step 210 could easily be performed using existing databases or server lists or could be performed using a special visual identifier key designed specifically for this purpose.

In step 212, a template is accessed to define how the final output of device information should be organized. For example, each group could be organized horizontally, with reference points at the top and the device information disposed beneath the associated reference point, or vertically, with the reference points first, the network switch next, and then a listing of servers associated therewith. It will be recognized that the groups may be organized in any manner beneficial to the user and that this feature is not intended to limit the scope of the embodiments described herein.

It will be recognized that each of steps 202-212 is performed for each image obtained by the system within a particular time frame. Once all of the images are so processed, in step 214, all of the processing results are combined. In this step, redundant information is removed so that the most comprehensive listing of groups can be achieved. For example, custom logic may be employed to ignore data graphs from certain images due to the angle of the image. In particular, the groups developed in step 208 are taken, and the visual identifiers developed in step 210 are used and then the template identified in step 212 is applied. This step 214 is performed for all of the data and the final output is built therefrom. The final output can be displayed in any electronic form, including a graphic, report, html, or pdf document. Each visual identifier is able to provide a location in the overall setup and provide a total picture of the data center. Additionally, a total inventory of all machines that are labeled and installed within the data center is enabled by the embodiments described herein.

Application of the embodiments shown and described herein is not limited to data centers; rather, the concepts may be applied to any organized layout of inventory. As long as each item to be inventoried is labeled with a label that is visible to a digital camera and reference points are also labeled, the concepts described herein can be advantageously applied.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for mapping a location of each of a plurality of devices in a data center, the method comprising:

receiving image data comprising an image of at least a portion of the data center from a source;

processing the image data to locate visual identifiers displayed in the image, wherein each of the visual identifiers is associated with one of the devices or with a spatial reference point;

extracting the located visual identifiers and determining spatial coordinates for each of the identified visual identifiers from the image;

determining the spatial reference points from the image;

developing groups based on extracted visual identifiers and spatial coordinates thereof and the spatial reference points, wherein allowances are made for an angle of the image, wherein each group comprises a subset of related ones of the devices;

for each group, comparing each of the visual identifiers of the group with a key to determine information regarding the associated device to obtain processing results; and combining processing results corresponding to multiple images to remove redundant information and produce final results.

2. The method of claim 1 further comprising outputting the final results in a selected format comprising a graphic, a report, an html document, or a pdf document.

3. The method of claim 1 wherein the visual identifiers comprise barcodes.

4. The method of claim 1 further comprising applying an organizational template to the groups.

5. The method of claim 1 wherein the spatial reference points comprise device support apparatuses.

6. The method of claim 1 wherein the spatial reference points comprise permanent or semi-permanent features of the data center.

7. The method of claim 1 wherein the source comprises a digital camera.

8. A system for mapping a location of each of a plurality of devices in a data center, wherein each of the devices have a visual identifier associated therewith, the system comprising:

means for producing image data comprising an image of at least a portion of the data center;

means for receiving and processing the image data to locate the visual identifiers displayed in the image, wherein each of the visual identifiers is associated with one of the devices or with a spatial reference point;

means for extracting the located visual identifiers and determining spatial coordinates for each of the identified visual identifiers from the image;

means for determining the spatial reference points from the image;

means for developing groups based on extracted visual identifiers and spatial coordinates thereof and the spatial reference points, wherein allowances are made for an angle of the image, wherein each group comprises a subset of related ones of the devices;

means for, for each group, comparing each of the visual identifiers of the group with a key to determine information regarding the associated device to obtain processing results; and means for combining processing results corresponding to multiple images to remove redundant information and produce final results.

9. The system of claim 8 further comprising means for outputting the final results in a selected format comprising one of a graphic, a report, an html document, or a pdf document.

10. The system of claim 8 wherein the visual identifiers comprise barcodes.

11. The system of claim 8 wherein each group comprises a subset of the devices that are similarly situated with respect to one of the spatial reference points.

12. The system of claim 8 wherein each group comprises a subset of the devices that are of a similar type.

13. The system of claim 8 wherein the spatial reference points comprise permanent or semi-permanent features of the data center.

14. The system of claim 8 wherein the means for producing comprises a digital camera.

15. A computer program product comprising a non-transitory computer-readable medium having stored thereon computer-executable instructions for implementing a method for mapping a location of each of a plurality of devices in a data center, the instructions comprising instructions for:

receiving image data comprising an image of at least a portion of the data center from a source;

processing the image data to locate visual identifiers displayed in the image, wherein each of the visual identifiers is associated with one of the devices or with a spatial reference point;

extracting the located visual identifiers and determining spatial coordinates for each of the identified visual identifiers from the image;

determining the spatial reference points from the image;

developing groups based on extracted visual identifiers and spatial coordinates thereof and the spatial reference points, wherein allowances are made for an angle of the image, wherein each group comprises a subset of related ones of the devices;

for each group, comparing each of the visual identifiers of the group with a key to determine information regarding the associated device to obtain processing results; and combining processing results corresponding to multiple images to remove redundant information and produce final results.

16. The computer program product of claim 15 wherein the instructions further comprise instructions for outputting the final results in a selected format comprising at least one of a graphic, a report, an html document, or a pdf document.

17. The computer program product of claim 15 wherein the instructions further comprise instructions for applying an organizational template to the groups.

18. The computer program product of claim 15 wherein the spatial reference points comprise device support apparatuses.

19. The computer program product of claim 15 wherein the spatial reference points comprise permanent or semi-permanent features of the data center.

20. The computer program product of claim 15 wherein the source comprises a digital camera.

* * * * *